United States Patent

Mathews

[15] 3,693,335
[45] Sept. 26, 1972

[54] FLAIL TYPE ROTOR ASSEMBLY AND BLADE FOR SAME

[72] Inventor: Bernard C. Mathews, P.O. Box 70, Crystal Lake, Ill. 60014

[22] Filed: Jan. 3, 1972

[21] Appl. No.: 214,816

Related U.S. Application Data

[63] Continuation-in-part of Ser. No. 12,095, Feb. 17, 1970, Pat. No. 3,633,349.

[52] U.S. Cl. ..................56/294, 56/13.4, 56/504, 56/12.7
[51] Int. Cl. ..............................A01d 55/20
[58] Field of Search.56/294, 12.7, 13.4, 29, 249–254

[56] References Cited

UNITED STATES PATENTS

| | | | |
|---|---|---|---|
| 3,035,393 | 5/1962 | Mathews | 56/505 |
| 3,221,483 | 12/1965 | Ronning | 56/12.7 |
| 3,402,541 | 9/1968 | Panek et al. | 56/294 |
| 3,465,507 | 9/1969 | Fishaw | 56/294 |
| 3,505,800 | 4/1970 | McCanse | 56/294 |
| 3,555,797 | 1/1971 | Haun et al. | 56/294 |
| 3,604,188 | 9/1971 | Mott | 56/294 |

*Primary Examiner*—Russell R. Kinsey
*Attorney*—Zabel, Baker, York and Jones

[57] ABSTRACT

The rotor has four rows of blade mounts on its surface, the rows spaced 90° apart. Each blade mount is a U-shaped metal strip welded to the rotor surface. The blade has a shank and is single side arm, the latter terminating in a laterally disposed cutting edge. The free end of the shank is screw threaded, the shank extending through the blade mount and being confined therein by a lock nut on the screw threaded end. Paddles are also mounted on the rotor in the same fashion and create windage. A link may be interposed between the blade and the blade mount where additional blade movement is desired.

12 Claims, 10 Drawing Figures

PATENTED SEP 26 1972 4,693,335
SHEET 1 OF 2
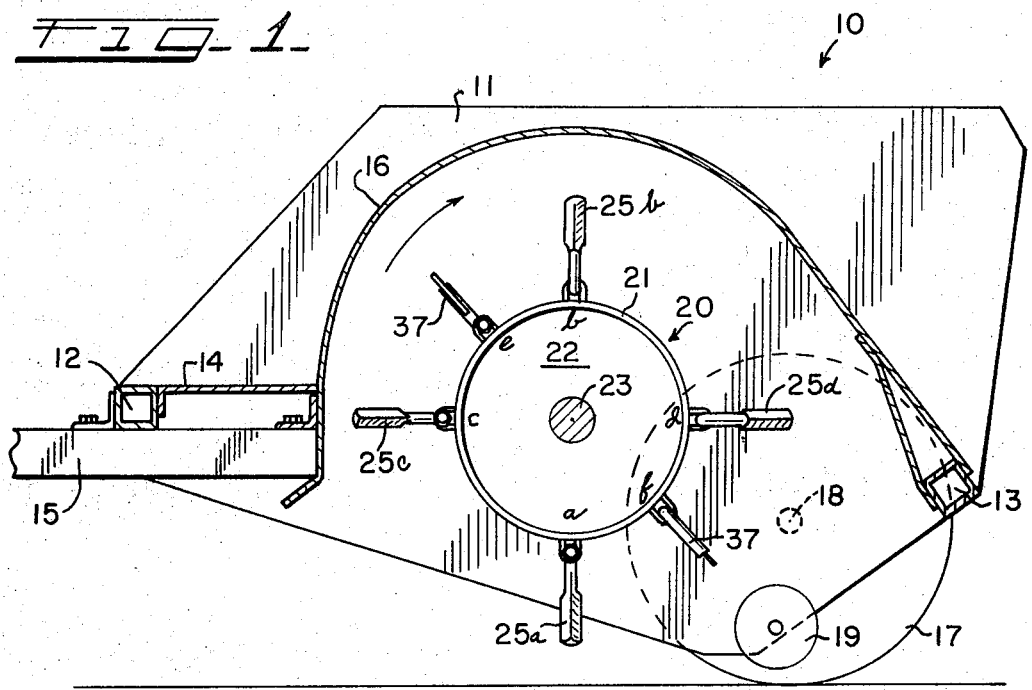
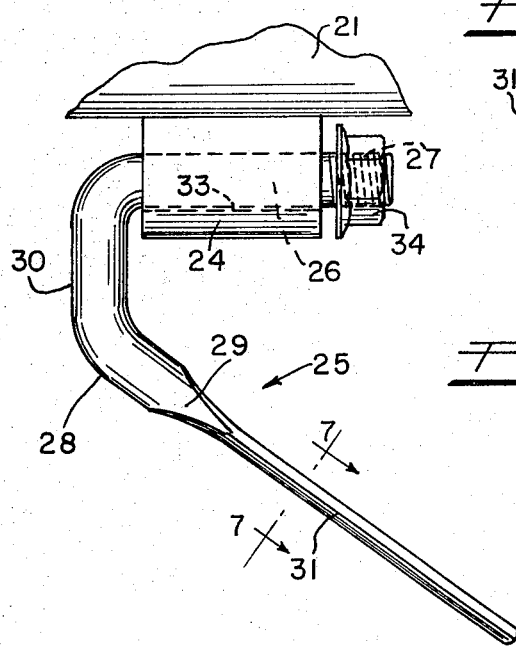
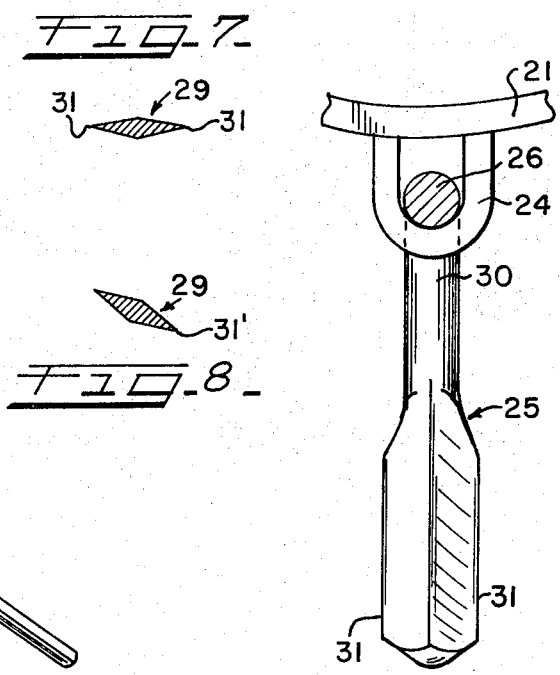

PATENTED SEP 26 1972　　　　　　　　　　4,693,335

FLAIL TYPE ROTOR ASSEMBLY AND BLADE FOR SAME

This application is a continuation-in-part of my copending application Ser. No. 12,095 now U.S. Pat. No. 3,633,349, filed Feb. 17, 1970.

This invention relates to an improved flail type rotor assembly and a blade for same.

It was pointed out in the aforesaid copending application that there are certain advantages in a blade element having a shank of circular cross section which is oriented parallel to the rotor axis and is of substantial length and which is received within a blade mount also of substantial length in axial direction so as to minimize the wear at the hinge point, as contrasted with strip type blades in which the bearing surface between the blade and the blade support is of a length only equal to the thickness of the metal strip of which the blade is fabricated.

A blade of the type described in the aforesaid application and in this application can conveniently be referred to as a rod stock type of blade since it can be conveniently made from a length of rod stock bent and shaped to provide a forwardly facing cutting edge. Such blade is of a lightweight construction which has certain advantages as contrasted with the strip stock type of prior art blades.

The aforesaid copending application disclosed a blade having two diagonal cutting edge portions which cross each other. The shank of the blade was received within a J-type blade mount and secured against removal by a keeper pin. The fabrication of such crossed edge blades involves swaging or forging two ends of the rod stock blank, and then some care was required in bending the same so that one edge portion cleared the other edge portion; in other words, the axes of all portions of the blade were not coplanar.

According to the present invention, I provide a rod stock blade which has only one cutting portion with the result that the shank portion has a free end. This permits the blade to be inserted in a closed or substantially closed loop type blade mount, and I have found that the shank can be securely retained within the loop type mount by a screw threaded means. More particularly, the free end of the shank is screw threaded, and then a nut having a diameter greater than the internal diameter of the loop type mount, is threaded onto the threaded end. The nut should be a suitable type of lock nut, and I have found that a so-called "clinch" nut is eminently suitable for this purpose. A clinch nut has upset threaded portions at its outer end so that during the last half revolution of the nut as it is threaded on to the shank, the threaded portions will be deformed into very tight engagement, preventing loosening of the nut during service. Nevertheless, the nut can be removed by the exertion of substantial wrenching force when it is desired to remove the blade.

Thus, an extremely simple and inexpensive mounting means is provided, facilitating replacement. At the same time the present blade retains the advantages of a bearing surface of substantial width between the blade mount and the blade shank, and one which is oriented parallel to the rotor axis.

An additional advantage of the present blade is that the bending operation is simplified because it does not require the twisting of crossed cutting edges out of a common plane. I have found that it is possible to make a rod stock blade which weighs only 2 or 3 ounces without detracting from the effectiveness of the rotor as a whole.

The blade, according to my invention, can be mounted in loop type blade mount which is either secured directly to the surface of the rotor, or which forms a part of an intermediate link. In either event, when a rock is hot by the blade, the damage to the blade is minimized due to its light weight, also there is less likelihood of injury to a bystander because the rock will be ejected with less force than in the case of a heavy strip stock blade.

Other objects, features and advantages of my invention will become apparent as the description proceeds.

In the drawings:

FIG. 1 is a sectional view of a flail type mower showing a rotor embodying my invention;

FIG. 3 is a front elevation of my improved blade;

FIG. 4 is an end view of FIG. 3, partly in section;

FIG. 7 is a secton along line 7—7 of FIG. 3;

FIG. 8 is a view similar to FIG. 7, showing mounting modification;

Figure 2:
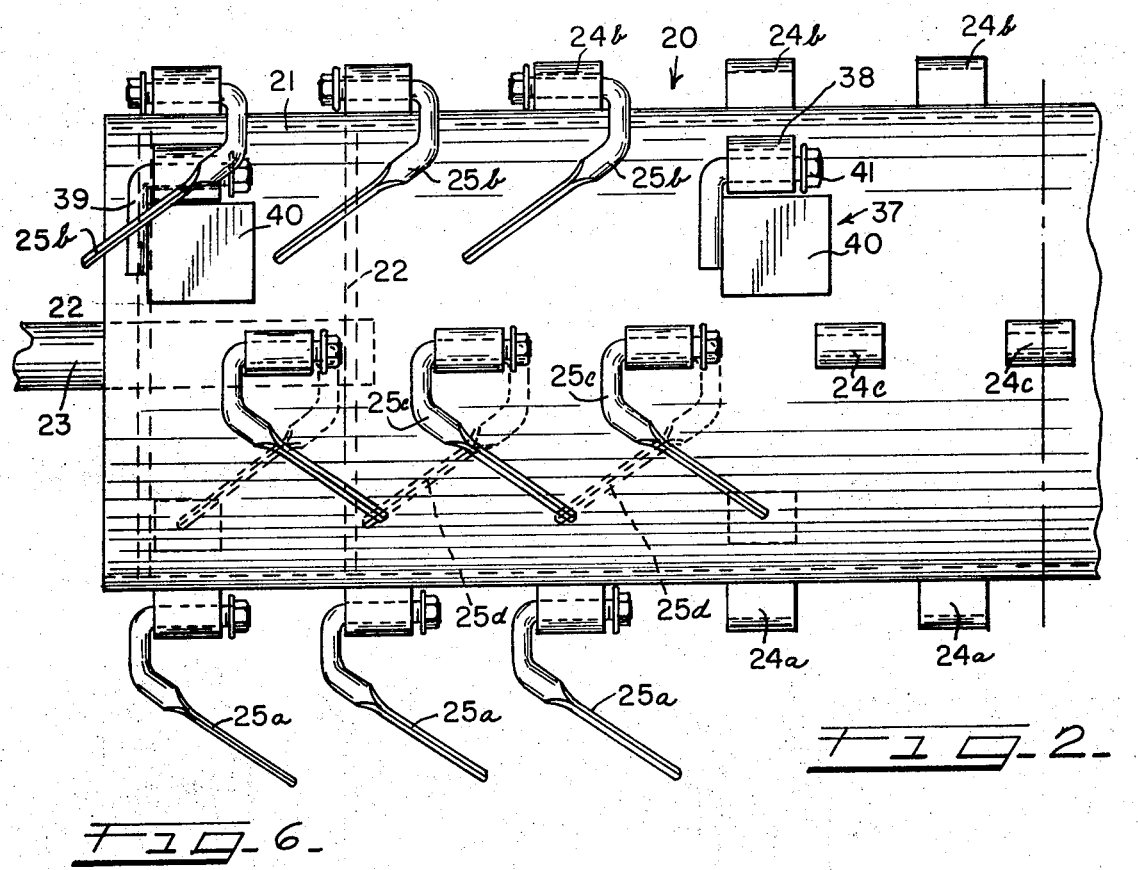
FIG. 2 is a front elevation of the rotor of FIG. 1.

FIG. 1 shows a flail type mower 10 which includes a rotor 20 having a plurality of pivotally mounted blades 25 extending from the surface thereof. The mower 10 may be of any suitable construction; by way of example, it is here shown as a mower which is adapted to be drawn behind a tractor for cutting large expanses of lawn, such as are found in parts, golf courses, and some residences. The frame structure of the mower 10 includes side plates 11 which are connected to each other by suitable cross members including a front cross rail 12, a rear cross rail 13, and a horizontal plate 14 located just behind the front rail 12. A draw bar 15 is suitable secured to the front rail 12 and the plate 14. A sheet metal cover 16 extends from one side plate to the other and is secured at the front end to a flange of the plate 14 and at its rear end to the rear cross rail 13. Suitable rubber tired wheels 17 are located exteriorly of side plates 11 and mounted on stub shafts 18 which are adjustably mounted by conventional means, not shown. An antiscalping roller 19 is suitable journalled suitably the side plates 11.

The rotor 20 is journalled in the side plates and is driven in the direction of the arrow by suitable means, not shown, such as a gasoline engine, or a power take off from the tractor.

The rotor 20 comprises a tubular member 21 having at each end a pair of closure disks 22. A stub shaft 23 at each end of the rotor is supported by the closure disks 22 whereby the rotor may be mounted between the side plates 11 in suitable bearings, not shown. The rotor has on its surface a plurality of loop type blade mounts 24 arranged in four rows designated a, b, c and d. Each blade mount is in the form of a U-shaped metal strip welded to the rotor surface. In the embodiment shown, the width of the blade mount is 1¼ inches.

Each blade 25 comprises a shank 26, and a side arm 28, the latter including a diagonal extension 29. That portion of the side arm which connects the diagonal 29 and the shank 26 is indicated by the reference numeral 30. The free end of the shank 26 is screw threaded at 27, and a clinch nut 34, or equivalent means, engages the projecting end of the shank so as to prevent removal of the shank 26 from the blade mount 24. It will be noted that the length of the shank between the connecting portion 30 and the inner surface of the nut 34 is somewhat greater than the width of the blade mount so there is no binding, but the blade is free to swing back and forth and will be thrown outwardly by the rotation of the rotor 20.

I have found that if the blade 25 is made in essentially the proportions shown in FIGS. 3 and 4, that it will have a balance point about midway the length of the shank 26, measured from the projection of the vertical line constituting the outer surface of the connecting portion 30 to the right hand end of the shank, such point being indicated by the reference numeral 33. It has been found that when thus balanced, the wear of the blade mount 24 is uniformly distributed along its width.

The extension 29 is shaped as to provide preferably two cutting edges 31 so that there will be a forwardly facing cutting edge irrespective of the orientation of the blade 25 in the blade mount 24, as illustrated by comparing the orientation of the blades in rows $a$ and $b$. The blade is manufactured from a length of rod stock of high carbon steel. One end of the blank is forged or swaged to provide the cutting edges 31. Then the blank is bent so as to provide the three sections 26, 30 and 29. Then the blade is heat treated. Thus it is possible to provide a high quality of lightweight blade at a low manufacturing cost.

A particular advantage of my arrangement is that if any blade becomes nicked or damaged in use, it can readily be replaced by removing the clinch nut 34 and substituting a new blade. Such damaged blade can be reversed and used in a different row in which the blades have the opposite orientation.

As shown in FIG. 7, the line connecting the edges 31 of the extension 29 is substantially perpendicular to the plane common to the axes of portions 26, 30, and 29, thus making the blade 25 reversible. However, in some instances, it is possible to incline the cutting edges as shown in FIG. 8, in order to give greater lift to the grass clippings and also to create windage. In this event, the blade is not reversible, but two types are required, one for rows $a$ and $c$, and another for rows $b$ and $d$.

Figure 6:
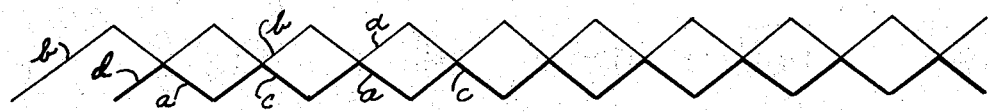
FIG. 6 is a diagram illustrating the contour of the cut.

The blades of rows $a$ and $b$ are oppositely oriented to each other which provides a zigzag contour of the cut grass, indicated by the connected lines $a$ and $b$ in the diagram of FIG. 6. In a blade of the proportions shown in which the cutting edge 31 is 2½ inches long, the vertical distance between the crest and valley of the line $a$–$b$ is substantially 1½ inches. By providing rows $c$ and $d$, in which the blade mounts 24 are located in a direction parallel to the rotor axis, midway between the axial location of mounts 24$a$, the vertical crest to valley distance of the cutting contour is reduced to three-fourths inch and is indicated by the heavy line $a$, $b$, $c$, $d$ in FIG. 6. This imparts a pleasing "combed" effect to a lawn.

The wheels 17 are adjustably mounted so as to regulate the length of cut.

In a mower in which the cover 16 has an outlet at the top, or rear quarter, plus a grass catching basket, my improved rotor will pick up the clippings during mowing, or it can be used as a leaf sweeper. For this purpose, a plurality of paddles 37 are mounted at balanced and symmetrical positions on the rotor surface. For instance, as shown in FIG. 1, there may be a row $e$ and a row $f$ of paddles 37 located at the 45° position between rows $c$ and $b$ and $a$ and $d$, respectively. These create the windage which is required to throw the grass clippings or leaves upwardly through an opening in the cover, and there need be only relatively few paddles in a given row.

Figures 5, 9, 10:
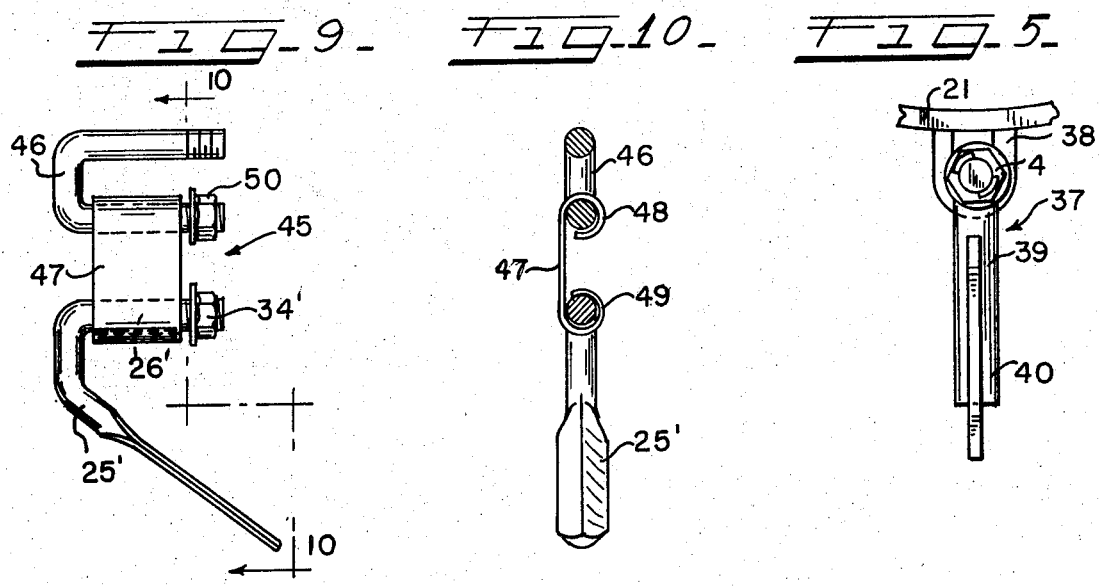
FIG. 5 is an end view of a paddle element shown in FIG. 2.
FIG. 9 is a front view of a link type mounting for my improved blade.
FIG. 10 is an end view of FIG. 9.
Figure 2:
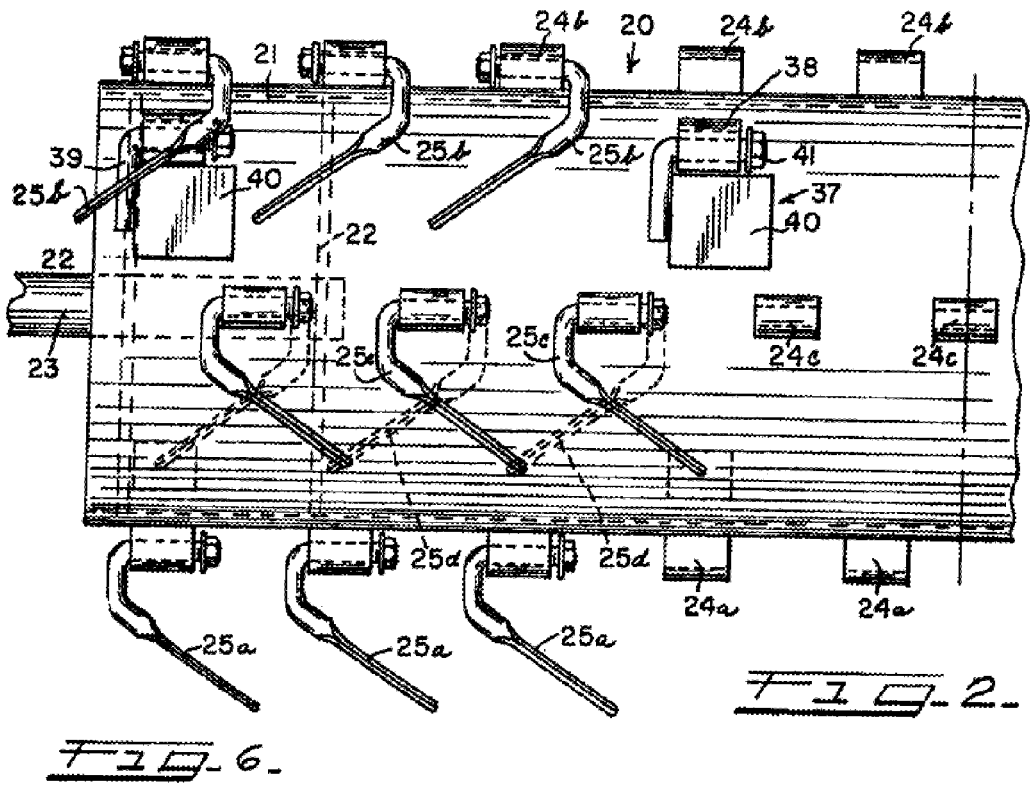
Figure 6:
Figures 5, 9, 10:
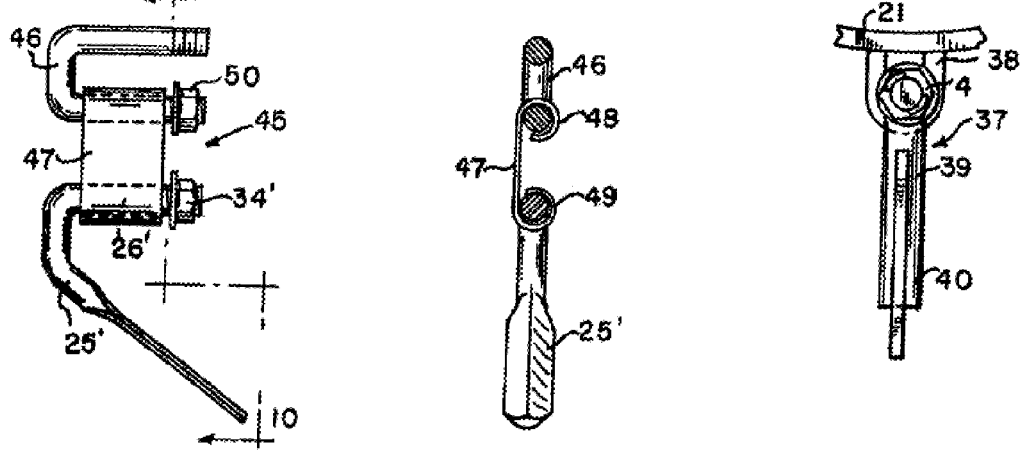

As shown in FIGS. 2 and 5, the paddles are mounted on loop type mounts 38 substantially identical to the mounts 24. The paddle comprises a bent rod 39 to which a plate 40 is welded, with the upper edge of the plate spaced from the horizontal shank portion of the bent rod 39. The free end of the shank portion is threaded and maintained in place by a clinch nut 41. Thus it is possible to use a rod stock type of blade and still obtain sufficient windage to blow the grass clippings or leaves into a basket.

The paddles 37 are sufficiently shorter than the blades 25 so that the windage will not tend to blow the blades of grass forwardly, thereby affecting the contour of the cut. For example, the paddles 37 are only about three-quarters of the length of the blades 25 in the radial direction.

It has also been found that my improved blade can be used for thatching the lawn when the rotor is lowered sufficiently. The term "thatching" in the gardening trade means the picking up of dried grass clippings and scarifying the surface to stimulate growth. The antiscalping roller is either re-set or removed for thatching.

For lawn cutting type of service, the rotor arrangement shown in FIG. 2 is eminently satisfactory in which the blades 25 are mounted directly on the rotor surface. However, in situations where a link type of mounting is desired, as shown in the aforesaid copending application, then it is possible to interpose a link assembly 45 (FIGS. 9 and 10) between the blade mount 24 and the blade 25'.

As shown in FIGS. 9 and 10, the link assembly comprises a U-bolt 46 threaded at both ends. A plate 47 having loops 48 and 49 connects the U-bolt 46 with the shank 26' of the blade, the loop 49 thus constituting a loop type mount for the blade 25'. A nut 50 confines the link 47 to the lower span of the U-bolt 46, and the upper span is confined within the loop type mount 24 secured to the drum and confined therein by a suitable nut, not shown. In this arrangement, the 25'provides the desired windage. One advantage of this link construction is that all three bearing surfaces are of substantial width and in both instances, the shank element is readily removable.

The term "loop type," as used herein, designates any one of several configurations in which the loop is closed, or substantially closed, so that insertion of the shank into the loop must be an endwise insertion.

The angle between the cutting edge 31 and the axis of the shank 26 is preferably between 30° and 45°, and I have found a 38° angle to perform satisfactorily.

In the example shown, the drum is 8⅝ inches in diameter, and the radial distance between the rotor axis and the blade tip is 8½ inches. When drawn at 6 miles per hour, I have found that a rotor speed of 1,800 RPM provides a very satisfactory cut, and a finished appearance for a well established lawn.

The type of rotor assembly shown also mows satisfactorily coarser stands of grass, or grass and weeds, such as golf course "rough" and road shoulders.

The diagonal disposition of the extension 29 and the forwardly facing cutting edge 31 provides a self cleaning blade since any grass caught on the parts 29, 30 and 31 will slide off of the blade due to centrifugal force.

Although only preferred embodiments of my invention have been shown and illustrated herein, it will be understood that various modifications and changes can be made in the constructions shown without departing from the spirit of my invention, as pointed out in the appended claims.

I claim:

1. A flail type rotor assembly for a mowing machine comprising a rotor drum, a plurality of loop type blade mounts extending from the surface thereof, a plurality of blades, each having a shank and a single side arm, said side arm including a diagonally disposed extension, said extension having a forwardly facing cutting edge, said shank being received within one of said loop type blade mounts with the free end thereof extending beyond same, and means engaging said free end and confining said shank portion within said blade mount.

2. A flail type rotor assembly as claimed in claim 1 in which said blade mounts are rigidly secured to said drum surface.

3. A flail type rotor assembly as claimed in claim 1 in which said blade mounts are pivotally mounted on said drum surface.

4. A flail type rotor assembly as claimed in claim 1 in which said blade comprises a length of high carbon steel rod stock bent to provide said shank and said side arm including said extension, and said extension being flattened with respect to its longitudinal axis to provide said cutting edge.

5. A flail type rotor assembly as claimed in claim 1 in which said confining means is a clinch nut.

6. A flail type rotor assembly as claimed in claim 1 in which the axis of said extension is disposed at from 30° to 45° to the axis of said rotor drum.

7. A flail type rotor assembly as claimed in claim 1 having a plurality of hingedly mounted paddles located on the surface of said drum.

8. A flail type rotor assembly as claimed in claim 1 in which said blade mounts are arranged in four rows, a, b, c, d, spaced from each other by 90° with rows a and b 180° apart, and rows c and d 180° apart, the axial location of the mounts of rows a and b being identical to each other and the axial location of the mounts of rows c and d being identical to each other and being midway between the axial location of the mounts of rows a and b.

9. A flail type rotor assembly as claimed in claim 8 in which said extension is provided with two oppositely disposed cutting edges so that one of said cutting edges will be a forwardly facing cutting edge irrespective of the orientation of said blade within said blade mount, the blades associated with the mounts of rows a and b respectively being oppositely oriented to each other, and the blades associated with the mounts c and d respectively being oppositely oriented to each other.

10. A flail type rotor assembly for a mowing machine comprising a rotor drum, a plurality of loop type blade mounts extending from the surface thereof and having their axes parallel to the axis of said drum, a plurality of blades, each comprising a length of high carbon steel rod stock bent to provide a shank and a single side arm, said said arm including a diagonally disposed extension, said extension being flattened with respect to its longitudinal axis to provide a cutting edge, said shank being received within one of said loop type blade mounts with the free end thereof extending beyond same, said free end being threaded, and means engaging said threaded end and loosely confining said shank portion within said blade mount, said blade being oriented within said blade mount so that said cutting edge faces in the forwardly direction with respect to the rotation of said drum.

11. A flail type rotor assembly for a mowing machine comprising a rotor drum, a plurality of links hingedly mounted on the surface of said rotor drum, each link having at its outer end a loop type blade mount, a plurality of blades, each comprising a length of high carbon steel rod stock bent to provide a shank and a single side arm, said side arm including a diagonally disposed extension being flattened with respect to its longitudinal axis to provide a cutting edge, said shank being received within one of said loop type blade mounts with the free end thereof extending beyond same, said free end being threaded, and nut means engaging said threaded end and loosely confining said shank portion within said blade mount, said blade being oriented within said blade mount so that said cutting edge faces in the forwardly direction with respect to the rotation of said drum.

12. A blade for a flail type mower comprising a blank of rod stock of high carbon steel bent so as to provide three sections, the axes of which lie in a substantially common plane, the first and second sections being disposed substantially perpendicular to each other to provide a shank portion and a connecting portion, and the third section being disposed at an obtuse angle to the second section, the outer portion of said third section having two cutting edges facing in opposite directions and away from said substantially common plane, said blade having been heat treated after said edge formation and said bending, the free end of said first section being threaded.

* * * * *

UNITED STATES PATENT OFFICE
CERTIFICATE OF CORRECTION

Patent No. 3,693,335　　　　　　　　　Dated September 26, 1972

Inventor(s)　　Bernard C. Mathews

It is certified that error appears in the above-identified patent and that said Letters Patent are hereby corrected as shown below:

On Sheet 1 of the drawing and Sheet 2 of the drawing, at the upper right-hand corner, the number "4,693,335" has been changed to "3,693,335".

Signed and sealed this 12th day of February 1974.

(SEAL)
Attest:

EDWARD M. FLETCHER, JR.　　　　　　　C. MARSHALL DANN
Attesting Officer　　　　　　　　　　Commissioner of Patents

UNITED STATES PATENT AND TRADEMARK OFFICE
CERTIFICATE OF CORRECTION

| | | |
|---|---|---|
| PATENT NO. | : 3,693,335 | |
| APPLICATION NO. | : 05/214816 | |
| DATED | : September 26, 1972 | |
| INVENTOR(S) | : Mathews | |

It is certified that error appears in the above-identified patent and that said Letters Patent is hereby corrected as shown below:

DELETE DRAWING SHEET 1-2 AND SUBSTITUTE THEREFOR THE DRAWING SHEET CONSISTING OF FIGS 1-10 SHOWN ON THE ATTACHED PAGES.

Signed and Sealed this

Tenth Day of February, 2009

JOHN DOLL
*Acting Director of the United States Patent and Trademark Office*

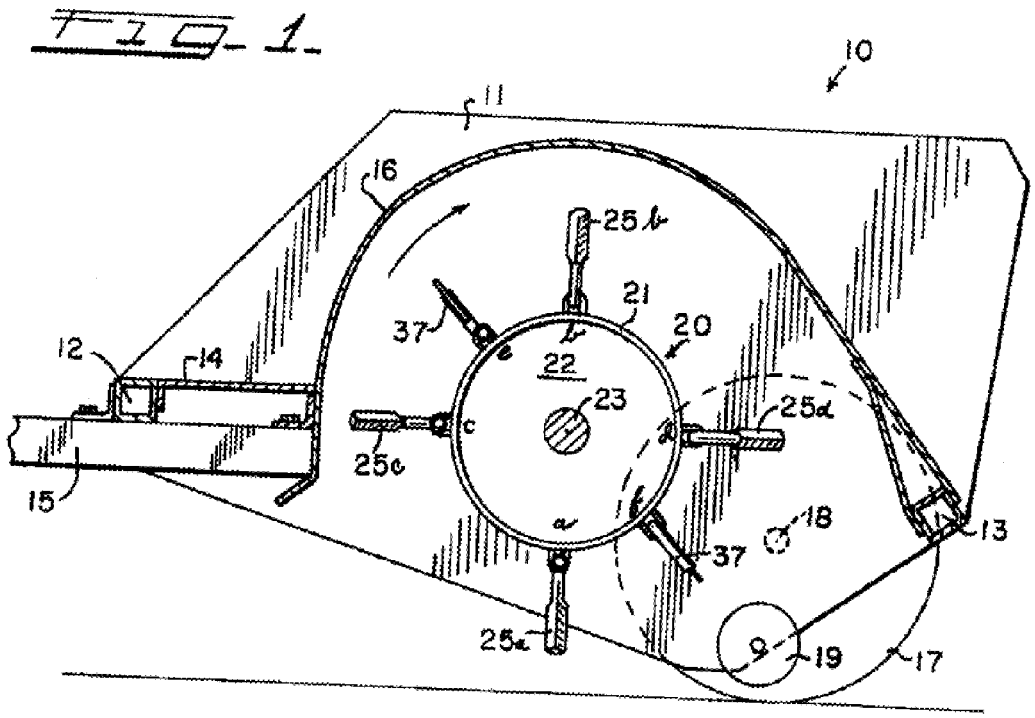
Fig. 1.
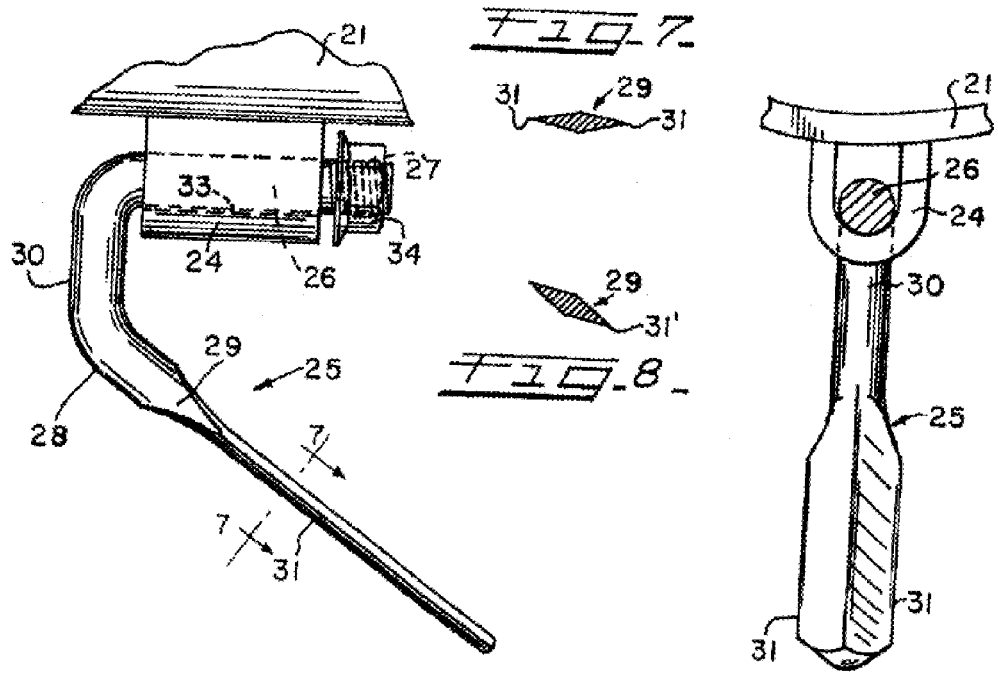
Fig. 7. Fig. 8.
Fig. 3. Fig. 4.